United States Patent
Andersson et al.

(10) Patent No.: US 10,979,247 B2
(45) Date of Patent: Apr. 13, 2021

(54) COMPUTING DEVICE AND METHOD FOR OPTIMIZING THE TUNNELING OF IP PACKETS

(71) Applicant: KALOOM INC., Montreal (CA)

(72) Inventors: Per Andersson, Montreal (CA); Benoit Tremblay, Montreal (CA); Suresh Krishnan, Atlanta, GA (US); Laurent Marchand, Montreal (CA)

(73) Assignee: Kaloom Inc., Montreal (CA)

( * ) Notice: Subject to any disclaimer, the term of this patent is extended or adjusted under 35 U.S.C. 154(b) by 5 days.

(21) Appl. No.: 16/520,564

(22) Filed: Jul. 24, 2019

(65) Prior Publication Data

US 2020/0036553 A1 Jan. 30, 2020

Related U.S. Application Data

(60) Provisional application No. 62/703,503, filed on Jul. 26, 2018.

(51) Int. Cl.
*H04L 29/06* (2006.01)
*H04L 12/46* (2006.01)

(52) U.S. Cl.
CPC .......... *H04L 12/4633* (2013.01); *H04L 69/04* (2013.01); *H04L 69/22* (2013.01); *H04L 2212/00* (2013.01)

(58) Field of Classification Search
CPC . H04L 69/04; H04L 12/4633; H04L 2212/00; H04W 28/06
See application file for complete search history.

(56) References Cited

U.S. PATENT DOCUMENTS

| 6,735,190 | B1 | 5/2004 | Chuah et al. |
| 9,444,723 | B1 * | 9/2016 | Di Benedetto ..... H04L 12/4641 |
| 2008/0101366 | A1 | 5/2008 | Venkitaraman et al. |

(Continued)

FOREIGN PATENT DOCUMENTS

WO 2015143982 A1 10/2015

OTHER PUBLICATIONS

Next-gen Network Telemetry is Within Your Packets: In-band OAM Author: Frank Brockners Jun. 28, 2017.

(Continued)

*Primary Examiner* — Hoon J Chung
(74) *Attorney, Agent, or Firm* — IP Delta Plus Inc.

(57) ABSTRACT

Computing devices and methods for transmitting and receiving optimized tunneling IP packets. At the entry point of a tunnel, an IP packet comprising at least one header is received. If data comprised in one of the at least one header of the received IP packet are redundant with data comprised in one or more tunneling header of a tunneling IP packet, then the redundant header is removed from the received IP packet. The tunneling IP packet encapsulating the received IP packet (with its redundant header removed) is transmitted. A header removal field is positioned in the tunneling IP packet to indicate the positive determination of redundancy. At the exit point of the tunnel, the tunneling IP packet is received. The header removal field and the one or more tunneling header of the tunneling IP packet are used for identifying the previous determination of redundancy and recreating the removed header.

28 Claims, 10 Drawing Sheets

(56) References Cited

U.S. PATENT DOCUMENTS

| | | |
|---|---|---|
| 2010/0189103 A1 | 7/2010 | Bachmann et al. |
| 2011/0216651 A1 | 9/2011 | Bansal et al. |
| 2012/0294211 A1* | 11/2012 | Zhu ........................ H04L 69/22 |
| | | 370/310 |
| 2015/0278148 A1 | 10/2015 | Sindhu |
| 2017/0064044 A1* | 3/2017 | Yang ....................... H04L 45/72 |
| 2017/0126849 A1 | 5/2017 | Herrero |

OTHER PUBLICATIONS

Toward a Network Telemetry Framework—Draft-song-ntf-o1 Author: H. Song, Ed. et al Network Working Group May 10, 2018.

\* cited by examiner

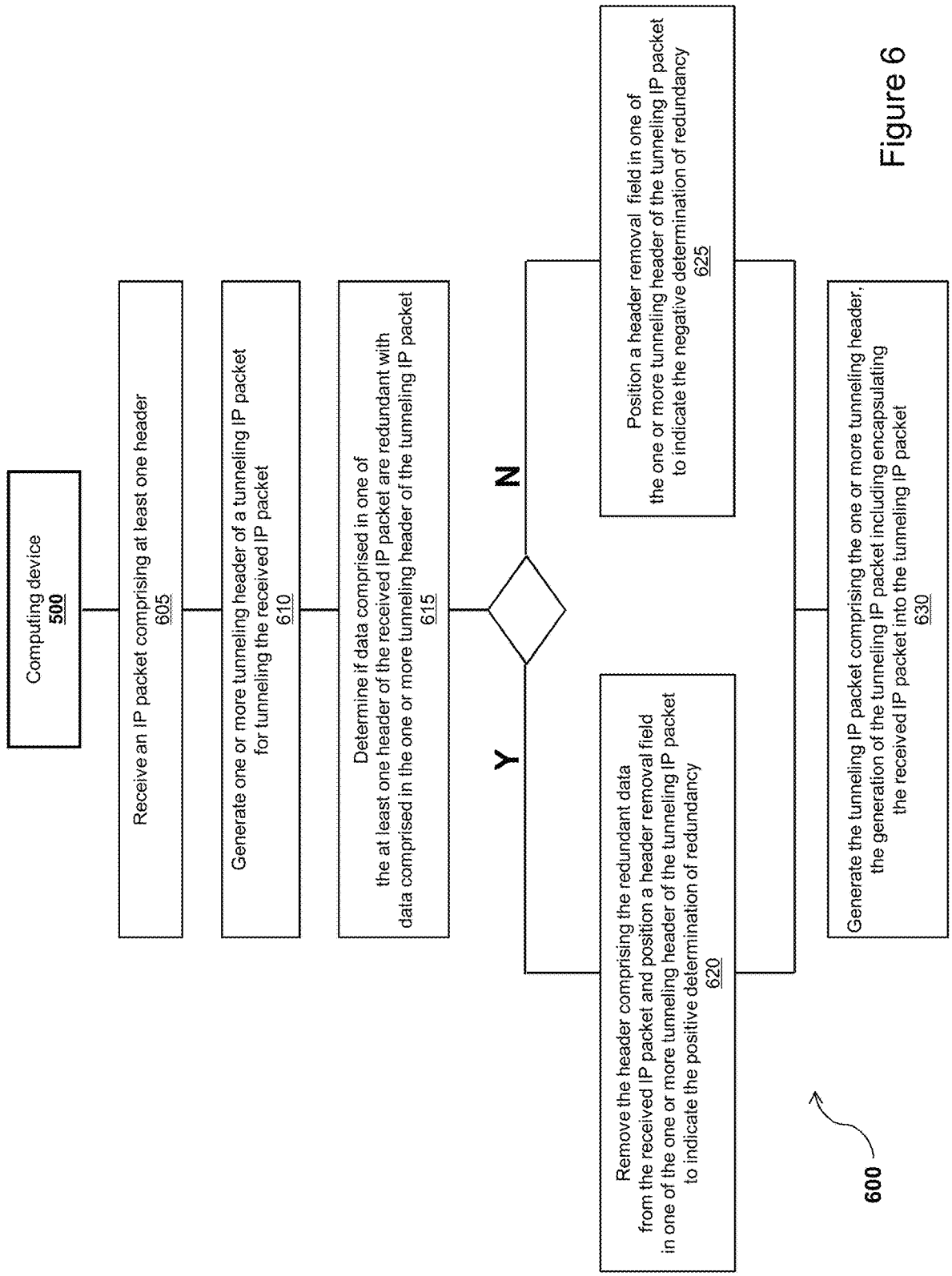

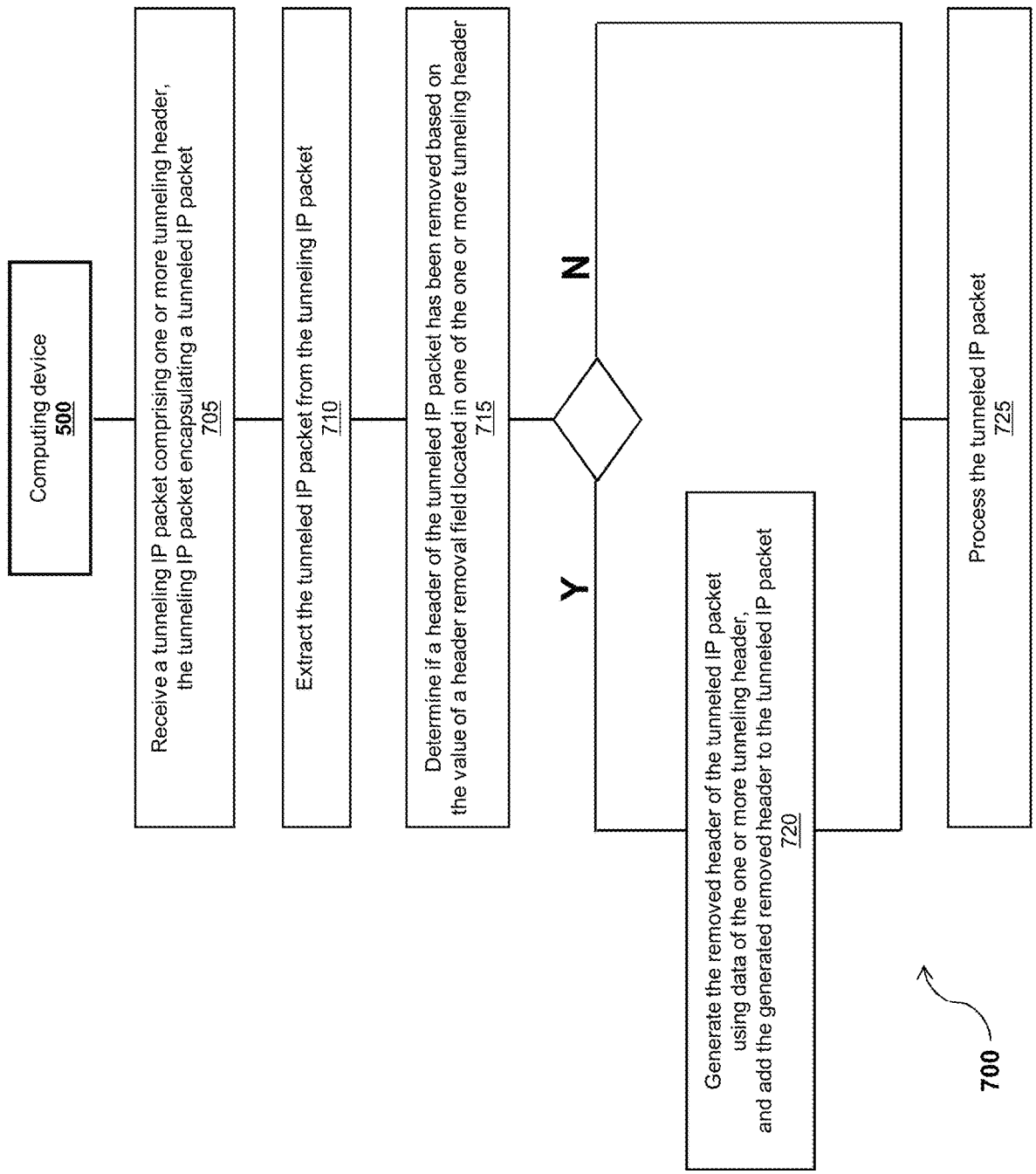

COMPUTING DEVICE AND METHOD FOR OPTIMIZING THE TUNNELING OF IP PACKETS

TECHNICAL FIELD

The present disclosure relates to the field of data centers. More specifically, the present disclosure relates to a computing device and method for optimizing the tunneling of Internet Protocol (IP) packets through a networking infrastructure of a data center.

BACKGROUND

Recent years have seen an increasing development of technologies such as Software as a Service (SaaS), cloud computing, etc. This development is fueled by a growing customer demand for products and services based on these types of technologies. This development is also fueled by constant progresses in underlying technologies, such as processing power increase for microprocessors, storage capacity increase for storage devices, and transmission capacity improvements for networking equipment. Furthermore, the average cost of these underlying technologies is falling. However, the decrease in the average cost of the underlying technologies is balanced by the increased customer demand, which requires to constantly update and upgrade the infrastructures used for providing SaaS or cloud computing.

The infrastructure used for providing SaaS or cloud computing is a data center, which combines a very large number of computing servers. Each server has a plurality of multi-core processors, and the combination of the computing servers provides a very high processing capacity, which is used by customers of the data center. Some or all of the servers may also have important storage capacities, so that the combination of the servers also provides a very high storage capacity to the customers of the data center. The data center also relies on a networking infrastructure, for interconnecting the servers and providing access to their computing and/or storage capacity to the customers of the data center. In order to provide a reliable service, very strong requirements in terms of scalability, manageability, fault-tolerance, etc., are imposed on the computing and networking infrastructure of the data center.

With respect to the networking infrastructure of the data center, it is well known that providing efficient and reliable networking services to a very large number of hosts is a complex task. Solutions and technologies have been developed in other contexts, such as networking technologies for providing mobile data services to a very large number of mobile devices. Some of these technologies have been standardized in dedicated instances, such as the Internet Engineering Task Force (IETF®) or the 3rd Generation Partnership Project (3GPP™). However, at least some of the technological challenges of deploying an efficient and reliable networking infrastructure in a data center are specific to the data center context; and need to be addressed with original solutions and technologies.

Tunneling of IP packets within the networking infrastructure of a data center can be used for optimization purposes, monitoring purposes, etc. For example, operations of the networking equipment (e.g. switch or router) located along the path of the tunnel are optimized. In another example, the tunneling IP packets include a dedicated telemetry header for performing in-band telemetry of the networking infrastructure of the data center.

However, the use of tunneling increases the size of at least some of the IP packets circulating over the IP networking infrastructure. More specifically, one or more tunneling header is added to an original IP packet when it is encapsulated in a tunneling IP packet. Therefore, the bandwidth required for transmitting a given amount of user or control data is increased when tunneling is used.

Therefore, there is a need for a computing device and method for optimizing the tunneling of IP packets through a networking infrastructure of a data center.

SUMMARY

According to a first aspect, the present disclosure relates to a computing device. The computing device comprises a communication interface and a processing unit. The processing unit receives via the communication interface an Internet Protocol (IP) packet comprising at least one header. The processing unit generates one or more tunneling header of a tunneling IP packet for tunneling the received IP packet. The processing unit determines if data comprised in one of the at least one header of the received IP packet are redundant with data comprised in the one or more tunneling header of the tunneling IP packet. If the determination is positive, the processing unit removes the header comprising the redundant data from the received IP packet and sets the value of a header removal field in one of the one or more tunneling header of the tunneling IP packet to indicate the positive determination of redundancy. If the determination is negative, the processing unit positions the value of the header removal field to indicate the negative determination of redundancy. The processing unit generates the tunneling IP packet comprising the one or more tunneling header. The generation of the tunneling IP packet includes encapsulating the received IP packet into the tunneling IP packet.

According to a second aspect, the present disclosure also relates to a computing device. The computing device comprises a communication interface and a processing unit. The processing unit receives via the communication interface a tunneling Internet Protocol (IP) packet comprising one or more tunneling header. The tunneling IP packet encapsulates a tunneled IP packet. The processing unit extracts the tunneled IP packet from the tunneling IP packet. The processing unit determines if a header of the tunneled IP packet has been removed based on the value of a header removal field located in one of the one or more tunneling header. If the determination is positive, the processing unit generates the removed header of the tunneled IP packet using data of the one or more tunneling header and adds the generated removed header to the tunneled IP packet.

According to a third aspect, the present disclosure relates to a method for transmitting optimized tunneling Internet Protocol (IP) packets. The method comprises receiving by a processing unit of a computing device via a communication interface of the computing device an IP packet comprising at least one header. The method comprises generating by the processing unit of the computing device one or more tunneling header of a tunneling IP packet for tunneling the received IP packet. The method comprises determining by the processing unit of the computing device if data comprised in one of the at least one header of the received IP packet are redundant with data comprised in the one or more tunneling header of the tunneling IP packet. If the determination is positive, the method comprises removing by the processing unit of the computing device the header comprising the redundant data from the received IP packet and setting by the processing unit of the computing device the value of a header removal field in one of the one or more tunneling header of the tunneling IP packet to indicate the positive determination of redundancy. If the determination is negative, the method comprises positioning by the processing unit of the computing device the value of the header removal field to indicate the negative determination of redundancy. The method comprises generating by the processing unit of the computing device the tunneling IP packet comprising the one or more tunneling header. The generation of the tunneling IP packet includes encapsulating the received IP packet into the tunneling IP packet.

According to a fourth aspect, the present disclosure relates to a method for receiving optimized tunneling Internet Protocol (IP) packets. The method comprises receiving by a processing unit of a computing device via a communication interface of the computing device a tunneling IP packet comprising one or more tunneling header. The tunneling IP packet encapsulates a tunneled IP packet. The method comprises extracting by the processing unit of the computing device the tunneled IP packet from the tunneling IP packet. The method comprises determining by the processing unit of the computing device if a header of the tunneled IP packet has been removed based on the value of a header removal field located in one of the one or more tunneling header. If the determination is positive, the method comprises generating by the processing unit of the computing device the removed header of the tunneled IP packet using data of the one or more tunneling header and adding by the processing unit of the computing device the generated removed header to the tunneled IP packet.

BRIEF DESCRIPTION OF THE DRAWINGS

Embodiments of the disclosure will be described by way of example only with reference to the accompanying drawings, in which:

FIG. 6 represents a method for transmitting optimized tunneling IP packets, which can be used in the context of the fabrics of FIGS. 1-3;

FIG. 7 represents a method for receiving optimized tunneling IP packets, which can be used in the context of the fabrics of FIGS. 1-3.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the optimization of a tunneling protocol used in an IP networking infrastructure, in order to reduce the bandwidth consumed by the tunneling protocol. The optimization is more specifically described in the context of a data center comprising one or more fabrics.

Network Architecture of a Data Center

Referring now concurrently to FIGS. 1-4, the network architecture of a data center is illustrated. The network architecture represented in the figures is for illustration purposes, and a person skilled in the art of designing data center architectures would readily understand that other design choices could be made. The teachings of the present disclosure are not limited to the topology of the network architecture represented in the figures; but could also be applied to a network architecture with different design choices in terms of topology.

Figure 1:
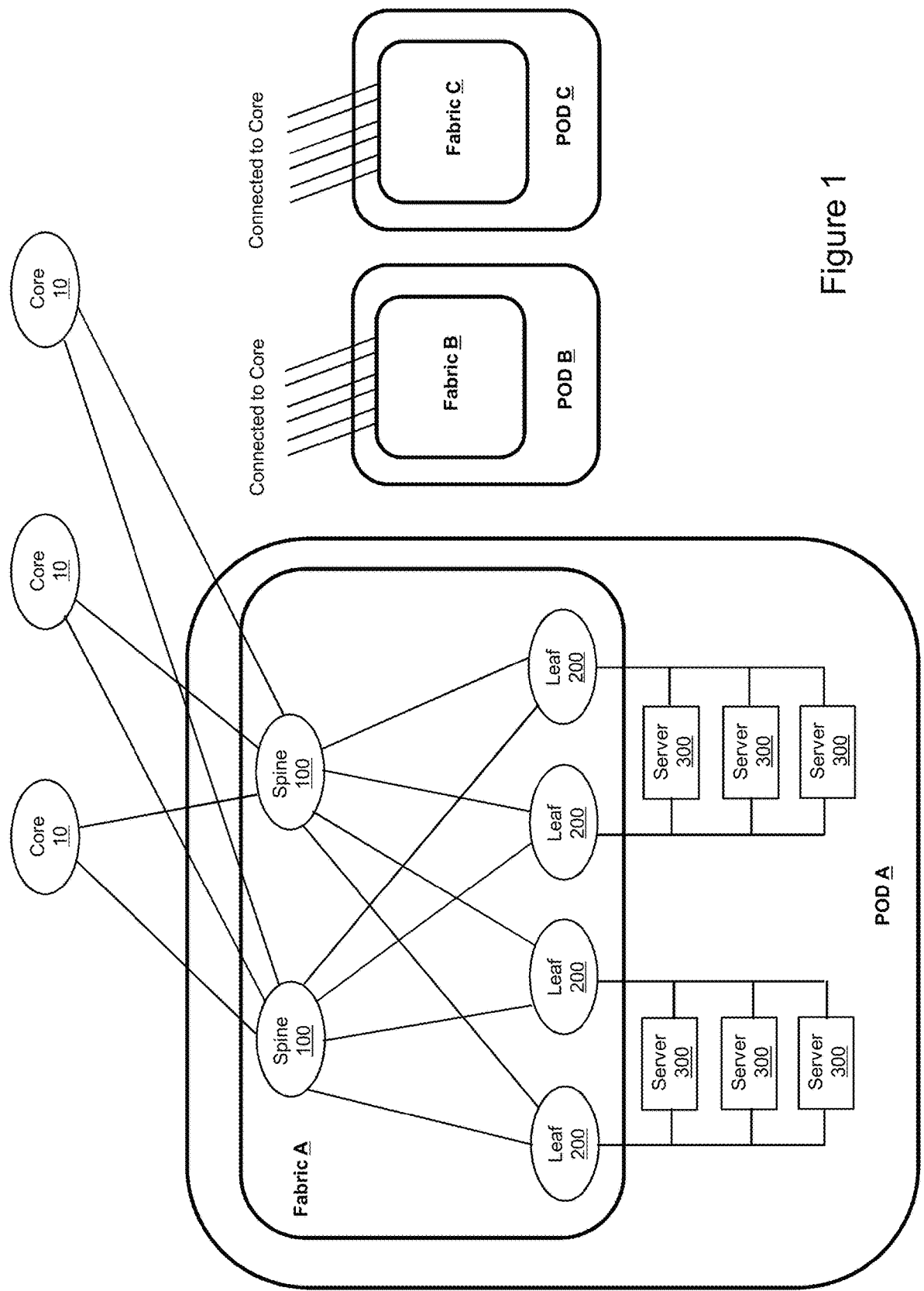
FIG. 1 represents a network architecture of a data center comprising a plurality of pods and fabrics.

Reference is now made more particularly to FIG. 1. The data center is organized into a plurality of pods. Each pod consists of an atomic unit of computing, storage, networking and power. Each pod is designed as a unit, deployed as a unit, automated as a unit, and retired as a unit. Several types of pods may be available, which differ by their design. Zero, one or more instances of each type of pod is deployed in the data center. For illustration purposes, three pods (A, B and C) have been represented in FIG. 1. However, the number of pods in the data center varies from one to tens or even hundreds of pods. The capacity in terms of computing, storage, networking and power of the data center is scaled, by adding (or removing) pods.

Pod A comprises a plurality of servers 300 providing the processing and storage power. The servers 300 are physically organized in one or more racks, depending on the number of servers 300 and the capacity of each rack. Pod A also comprises two hierarchical levels of networking power referred to as fabric A. Fabric A comprises a lower hierarchical level consisting of leaf networking equipment 200, and an upper hierarchical level consisting of spine networking equipment 100. The networking equipment (e.g. spine 100 and leaf 200) of fabric A are physically integrated to the one or more racks comprising the servers 300, or alternatively are physically organized in one or more independent racks.

The leaf networking equipment 200 and the spine networking equipment 100 generally consist of switches, with a high density of communication ports. Therefore, in the rest of the description, the leaf networking equipment 200 and the spine networking equipment 100 will be respectively referred to as leaf switches 200 and spine switches 100. However, other types of networking equipment may be used. For example, in an alternative implementation, at least some of the spine networking equipment 100 consist of routers.

Each leaf switch 200 is connected to at least one spine switch 100, and a plurality of servers 300. The number of servers 300 connected to a given leaf switch 200 depends on the number of communication ports of the leaf switch 200.

In the implementation represented in FIG. 1, each server 300 is redundantly connected to two different leaf switches 200. A server 300 of a given pod (e.g. pod A) is only connected to leaf switches 200 of the fabric (e.g. fabric A) belonging to the given pod (e.g. pod A). A server 300 of a given pod (e.g. pod A) is not connected to leaf switches 200 of a fabric (e.g. fabric B) belonging to another pod (e.g. pod B). Each leaf switch 200 of a given fabric (e.g. fabric A) is connected to all the spine switches 100 of the given fabric (e.g. fabric A). A leaf switch 200 of a given fabric (e.g. fabric A) is not connected to a spine switch 100 of another fabric (e.g. fabric B). In an alternative implementation not represented in the Figures, at least some of the servers 300 are connected to a single leaf switch 200.

Each spine switch 100 is connected to at least one core networking equipment 10, and a plurality of leaf switches 200. The number of leaf switches 200 connected to a given spine switch 100 depends on design choices and on the number of communication ports of the spine switch 100. The core networking equipment 10 provide interworking between the fabrics deployed in the data center, connection to management functionalities of the data center, connection to external networks such as the Internet, etc. Furthermore, although not represented in the Figures for simplification purposes, at least some of the core networking equipment 10 may be connect to a pair of leaf switches 200.

The core networking equipment 10 generally consist of routers. Therefore, in the rest of the description, the core networking equipment 10 will be referred to as core routers 10. However, other types of networking equipment may be used. For example, in an alternative implementation, at least some of the core networking equipment 10 consist of switches.

In the implementation represented in FIG. 1, each spine switch 100 of a given fabric (e.g. fabric A) is connected to all the core routers 10, and is connected to all the leaf switches 200 of the given fabric (e.g. fabric A).

For simplification purposes, fabric A represented in FIG. 1 only comprises two spine switches 100 and four leaf switches 200, while pod A only comprises two groups of three servers 300 respectively connected to leaf switches 200 of the fabric A. However, the number of spine switches 100 and leaf switches 200 of a fabric may vary, based on design choices and networking capabilities (e.g. communication port density) of the spine and leaf switches. Similarly, the total number of servers 300 of a pod may vary, based on design choices, based on the number of leaf switches 200 of the corresponding fabric, and based on networking capabilities (e.g. communication port density) of the leaf switches.

The details of pod B and its corresponding fabric B, as well as pod C and its corresponding fabric C, are not represented in FIG. 1 for simplification purposes. However, pod B/fabric B and pod C/fabric C include a hierarchy of spine switches 100, leaf switches 200 and servers 300 similar to the hierarchy illustrated for pod A/fabric A.

Figure 2:
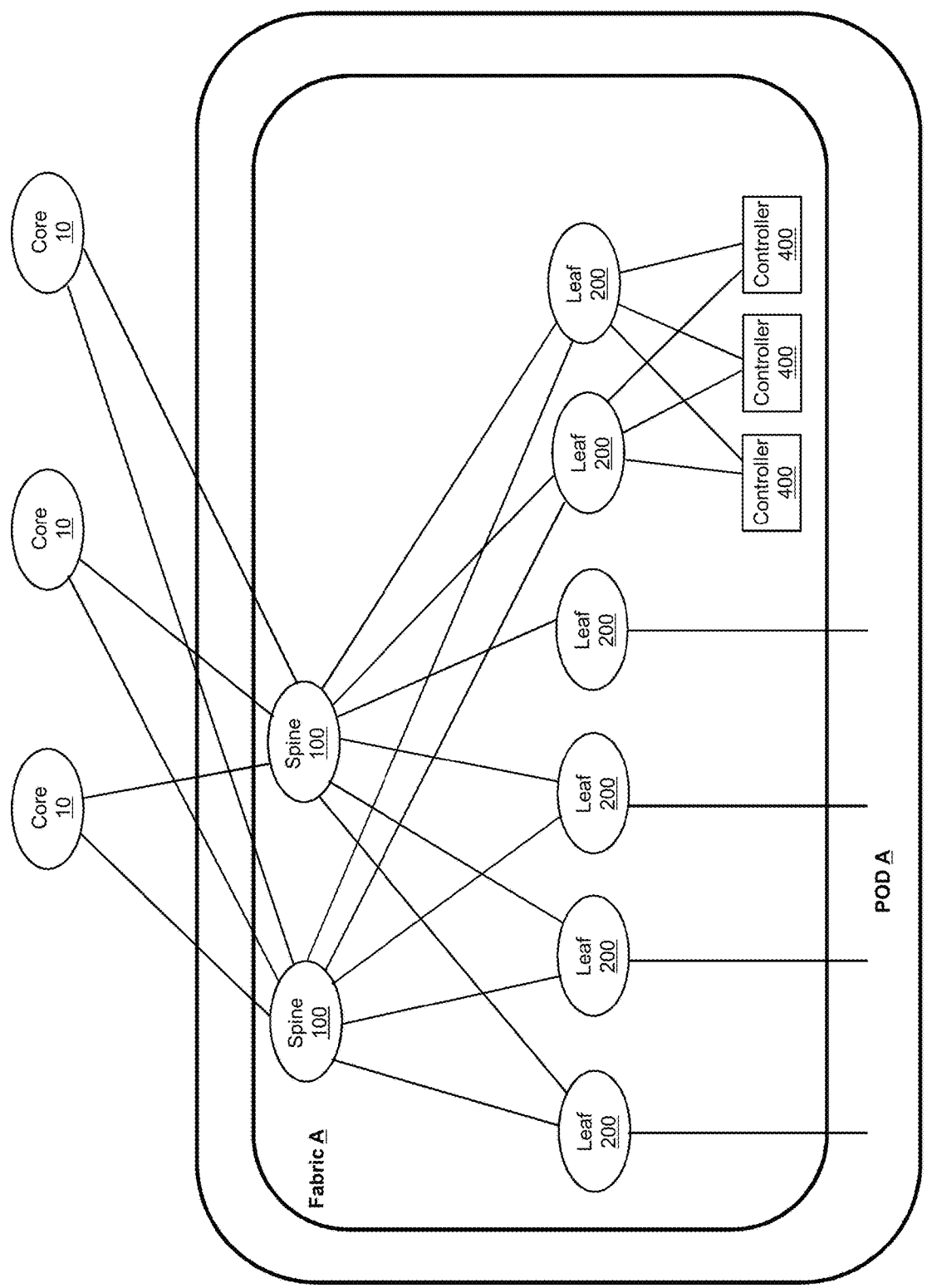
FIG. 2 represents a more detailed view of the fabrics represented in FIG. 1.

Reference is now made more particularly to FIGS. 1 and 2, where FIG. 2 represents an implementation of the data center of FIG. 1, where each fabric further includes one or more controllers 400. The servers 300 have not been represented in FIG. 2 for simplification purposes only.

The controllers 400 of a fabric are responsible for controlling operations of at least some of the nodes (e.g. leaf switches 200 and/or spine switches 100) included in the fabric. Each controller 400 is connected to at least one leaf switch 200. The number of controllers 400 deployed in a given fabric depends on design choices, on the required cumulative processing power of the controllers 400 deployed in the fabric, on the total number of leaf and spine switches deployed in the fabric, etc.

In the implementation represented in FIG. 2, each controller 400 is redundantly connected to two different leaf switches 200. For example, each controller 400 has a first operational connection to a first leaf switch 200, and a second backup connection to a second leaf switch 200. A controller 400 of a given fabric (e.g. fabric A) is only connected to leaf switches 200 of the fabric (e.g. fabric A). A controller 400 of a given fabric (e.g. fabric A) is not connected to leaf switches 200 of another fabric (e.g. fabric B or C). Some leaf switches 200 are dedicated to being connected to controllers 400 (as illustrated in FIG. 2), while other leaf switches 200 are dedicated to being connected to servers 300 (as illustrated in FIG. 1). In an alternative implementation, a leaf switch 200 is concurrently connected to servers 300 and controllers 400.

In another implementation, the controllers 400 are not directly physically connected to the leaf switches 200; but are logically connected via at least one intermediate equipment such as an intermediate switch (not represented in FIG. 2) between the controllers 400 and the leaf switches 200.

Figure 3:
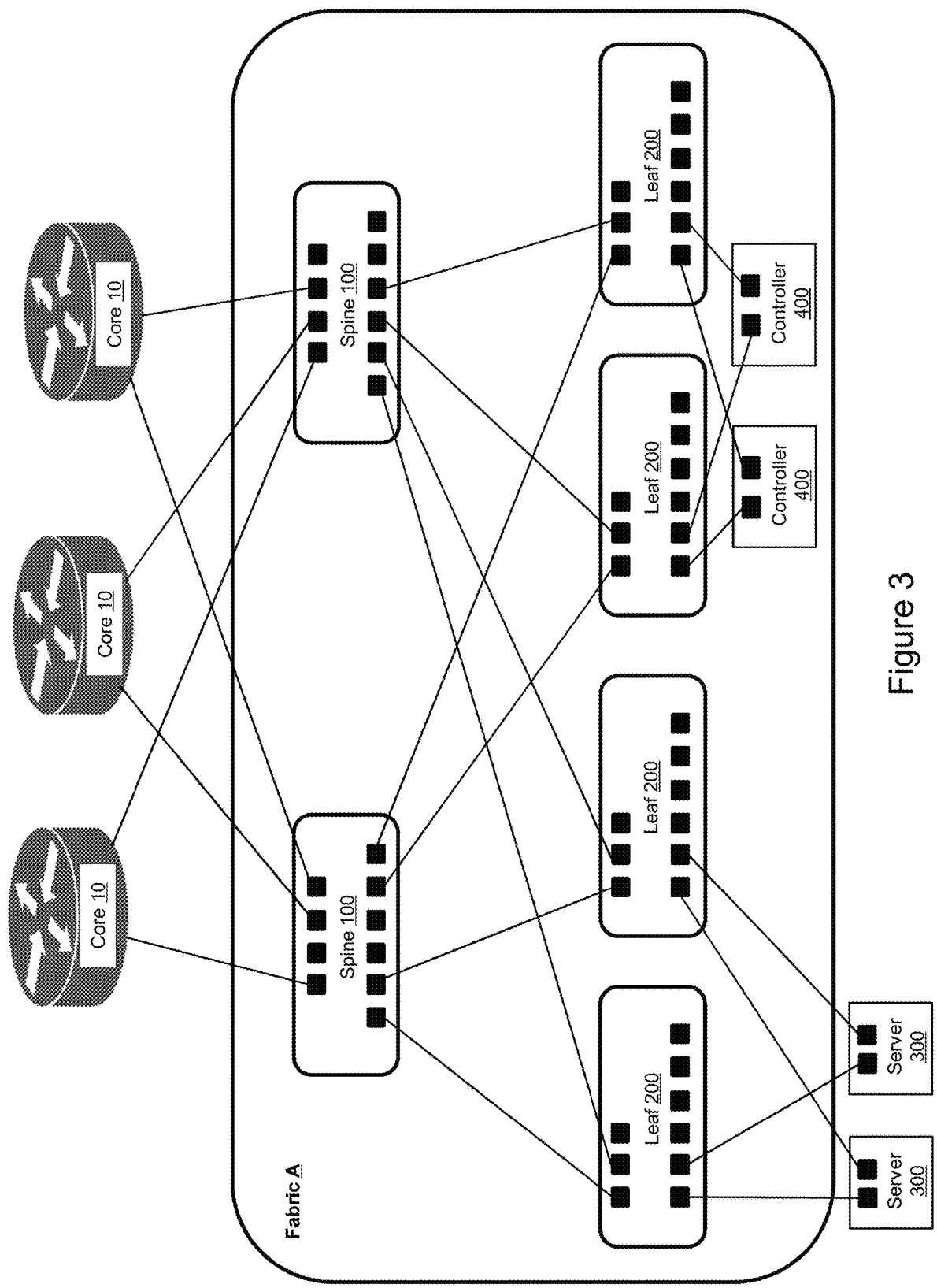
FIG. 3 represents communication ports of the equipment deployed in the pods and fabrics of FIGS. 1-2.

Reference is now made more particularly to FIGS. 1, 2 and 3, where FIG. 3 represents communication ports of the equipment deployed in a fabric/pod.

The spine switches 100 have a dedicated number of uplink communication ports (e.g. 4 represented in FIG. 3) dedicated to the interconnection with the core routers 10, and a dedicated number of downlink communication ports (e.g. 6 represented in FIG. 3) dedicated to the interconnection with the leaf switches 200. The uplink and downlink ports have the same or different networking capabilities. For example, all the ports have a capacity of 10 Gigabytes (Gbps).

The leaf switches 200 have a dedicated number of uplink communication ports (e.g. 3 represented in FIG. 3) dedicated to the interconnection with the spine switches 100, and a dedicated number of downlink communication ports (e.g. 6 represented in FIG. 3) dedicated to the interconnection with the servers 300 or controllers 400. The uplink and downlink ports have the same or different networking capabilities. For example, all the uplink ports have a capacity of 100 Gbps and all the downlink ports have a capacity of 25 Gbps. In the future, the capacity of the uplink ports will reach 200 or 400 Gbps, while the capacity of the downlink ports will reach 50 Gbps or 100 Gbps.

The leaf and spine switches generally consist of equipment with a high density of communication ports, which can reach a few dozens of ports. Some of the ports may be electrical ports, while others are fiber optic ports. As mentioned previously, the ports of a switch may have varying networking capabilities in terms of supported bandwidth. Switches with different networking capabilities and functionalities are generally used for implementing the leaf switches and the spine switches. The ports are not limited to communication ports, but also include enclosures for connecting various types of pluggable media.

By contrast, the servers 300 and controllers 400 are computing devices similar to traditional computers, with a limited number of communication ports. For example, each server 300 and each controller 400 comprises two communication ports, respectively connected to two different leaf switches 200. The two communication ports generally consist of Ethernet ports, with a capacity of for example 10 Gbps. However, the servers 300 and/or controllers 400 may include additional port(s).

All the aforementioned communication ports are bidirectional, allowing transmission and reception of data.

Figure 4:
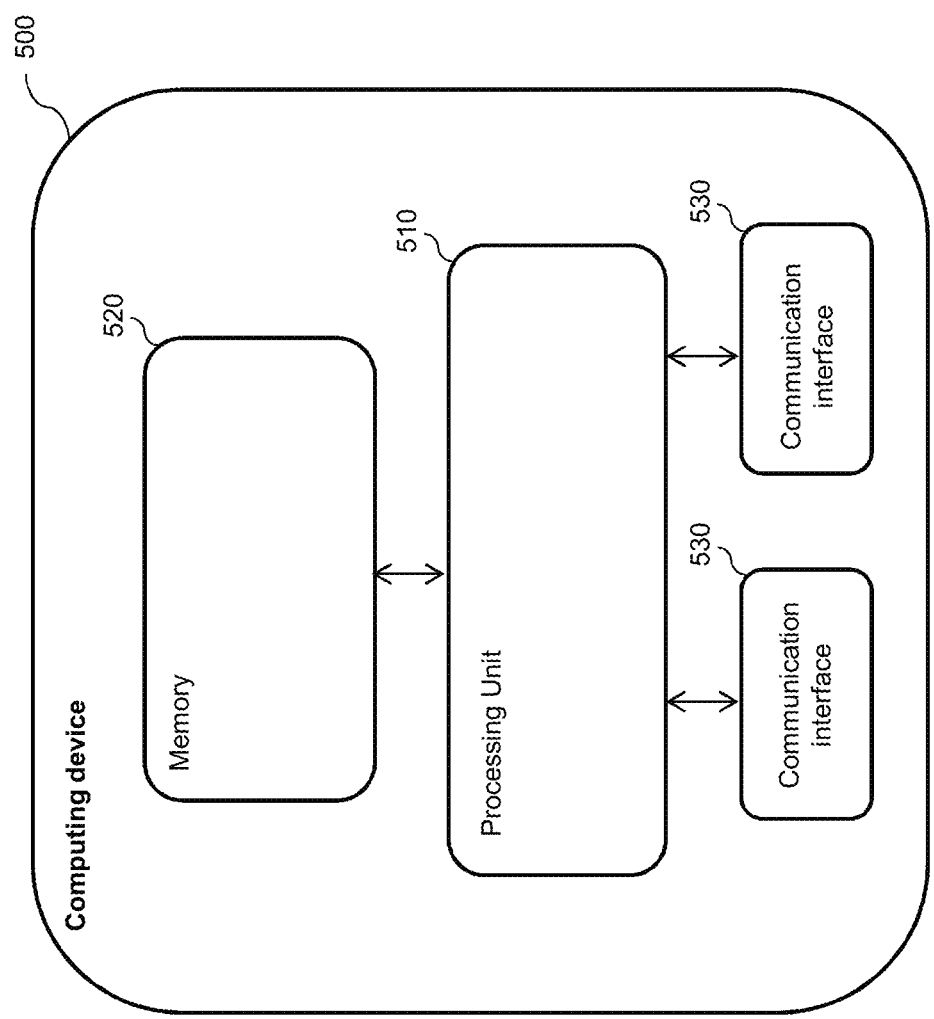
FIG. 4 illustrates a schematic representation of a computing device corresponding to equipment deployed in the fabrics represented in FIGS. 1-3.

Referring now to FIG. 4, a computing device 500 is illustrated in FIG. 4. The computing device 500 is a generic functional representation of the devices comprised in the fabric of FIGS. 1, 2 and 3. Thus, the computing device 500 represents a spine switch 100, a leaf switch 200 or a controller 400.

The computing device 500 comprises a processing unit 510, memory 520, and at least one communication interface 530. The computing device 500 may comprise additional components (not represented in FIG. 4 for simplification purposes). For example, in the case where the computing device 500 represents a controller 400, the computing device may include a user interface and/or a display.

The processing unit 510 comprises one or more processors (not represented in FIG. 4) capable of executing instructions of a computer program. Each processor may further comprise one or several cores. In the case where the computing device 500 represents a switch 100 or 200, the processing unit 510 further includes one or more dedicated processing components (e.g. a network processor, an Application Specific Integrated Circuits (ASIC), etc.) for performing specialized networking functions (e.g. packet forwarding).

The memory 520 stores instructions of computer program(s) executed by the processing unit 510, data generated by the execution of the computer program(s) by the processing unit 510, data received via the communication interface(s) 530, etc. Only a single memory 520 is represented in FIG. 4, but the computing device 500 may comprise several types of memories, including volatile memory (such as Random Access Memory (RAM)) and non-volatile memory (such as a hard drive, Erasable Programmable Read-Only Memory (EPROM), Electrically-Erasable Programmable Read-Only Memory (EEPROM), etc.).

Each communication interface 530 allows the computing device 500 to exchange data with other devices. At least some of the communication interfaces 530 (only two are represented in FIG. 4 for simplification purposes) correspond to the ports of the spine switches 100, leaf switches 200, and controller 400 represented in FIG. 3. Examples of communication interfaces 530 include standard (electrical) Ethernet ports, fiber optic ports, ports adapted for receiving Small Form-factor Pluggable (SFP) units, etc. The communication interfaces 530 are generally of the wireline type; but may also include some wireless ones (e.g. a Wi-Fi interface). The communication interface 530 comprises a combination of hardware and software executed by the hardware, for implementing the communication functionalities of the communication interface 530. Alternatively, the combination of hardware and software for implementing the communication functionalities of the communication interface 530 is at least partially included in the processing unit 510.

Optimization of a Protocol for Tunneling IP Packets Through a Networking Infrastructure of a Data Center Referring now concurrently to FIGS. 3, 5A, 5B and 5C, examples of tunneling occurring in the Fabric illustrated in FIG. 3 are illustrated.

In the rest of the description, we will refer to tunneling packets and tunneled packets. A tunneling packet encapsulates a tunneled packet. At the entry point of a tunnel, a source packet is received and a tunneling packet encapsulating the source packet is generated. The source packet is referred to as the tunneled packet as long as it is transported within the tunnel. At the end of the tunnel, the tunneled packet is extracted from the tunneling packet. The extracted tunneled packet corresponds to the original source packet. In the general case, the tunneled packet is not modified during its transit through the tunnel. However, a particular type of tunneling protocol may allow limited modification(s) to the tunneled packet during its transit through the tunnel. Furthermore, in the rest of the description, header(s) of the tunneling packets will be referred to as tunneling header(s); while header(s) of the tunneled packets will be referred to as tunneled header(s).

The present disclosure is aimed at packets using the IP protocol, referred to as IP packets or simply packets (the use of the IP protocol is then implied). The tunneling packets and the tunneled packets use one of the IPv4 or IPv6 protocol (the tunneling and tunneled IP packets do not necessarily use the same version of the IP protocol). For example, the tunneling packet comprises the IP header (IPv4 or IPv6 header), followed by dedicated tunneling header(s), followed by the tunneled IP packet. In another example, the tunneling packet comprises the IP header (IPv4 or IPv6 header), followed by one of the User Datagram Protocol (UDP) header or the Transmission Control Protocol (TCP) header, followed by dedicated tunneling header(s), followed by the tunneled IP packet. In still another example, the tunneling packet consists of an IPv6 packet using an IPv6 option for the dedicated tunneling header(s); and transporting the tunneled packet as a payload (over TCP or UDP, or directly over IPv6). However, in some cases, the tunneling protocol may not use the IP protocol; but rather operate at a lower protocol layer (e.g. Ethernet tunneling).

In the context of a data center comprising one or more fabric, a tunneling protocol is used for simplifying the operations of equipment of the one or more fabric, such as the spine switches 100 and the leaf switches 200. For example, the tunneling protocol can be used to simplify the networking operations performed by a networking equipment (e.g. spine switch 100 or leaf switch 200) receiving a tunneling packet. More specifically, the networking equipment does not need to perform a processing of the tunneled packet in view of its routing table to determine the next hop. The next hop can be easily determined based on information present in header(s) of the tunneling packet.

Details of the implementation of the tunneling protocol are out of the scope of the present disclosure. The present disclosure presents an optimization for tunneling protocols which is not limited in its application to data centers; but could be applied to various networking environments and various types of tunneling protocols.

Figure 5A:
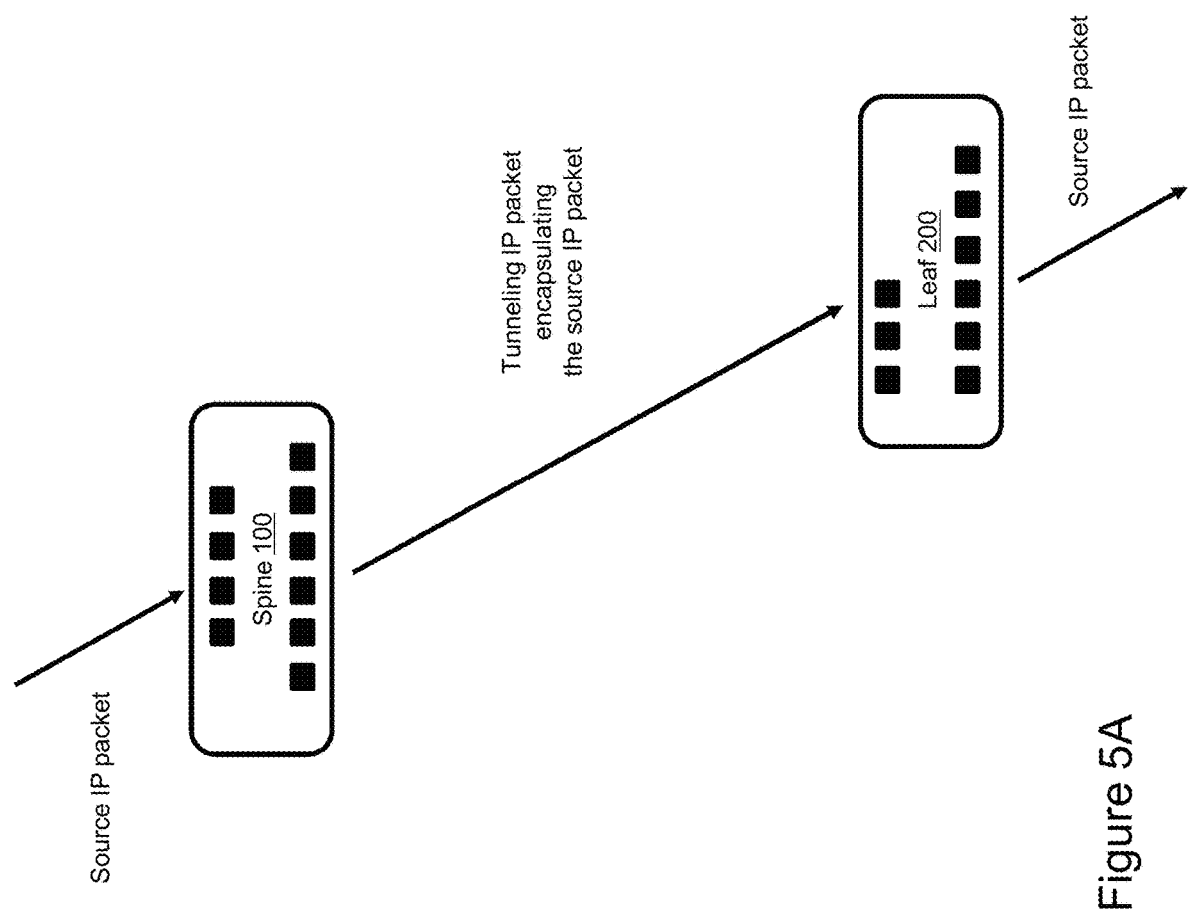
FIGS. 5A, 5B and 5C illustrate several use cases of IP tunneling in the fabrics of FIGS. 1-3.

Referring now more particularly to FIGS. 3 and 5A, a source IP packet is received by a spine switch 100 and a tunneling IP packet encapsulating the source IP packet is generated. The tunneling IP packet is transmitted to a leaf switch 200, where the source IP packet is extracted from the tunneling IP packet. For example, the source IP packet is an IPv4 packet and the networking infrastructure of the fabric is based on the IPv6 protocol. Thus, the tunnel is an IPv6 tunnel using tunneling IPv6 packets for transporting source IPv4 packets. Although not represented in FIG. 5A for simplification purposes, source IP packets are also tunneled from the leaf switch 200 to the spine switch 100. This tunnel can be used for exchanging data between the servers 300 and computing devices located outside the fabric, the computing devices using the IPv4 protocol (the servers 300 are adapted to use either of the IPv4 or IPv6 protocol).

Figure 5B:
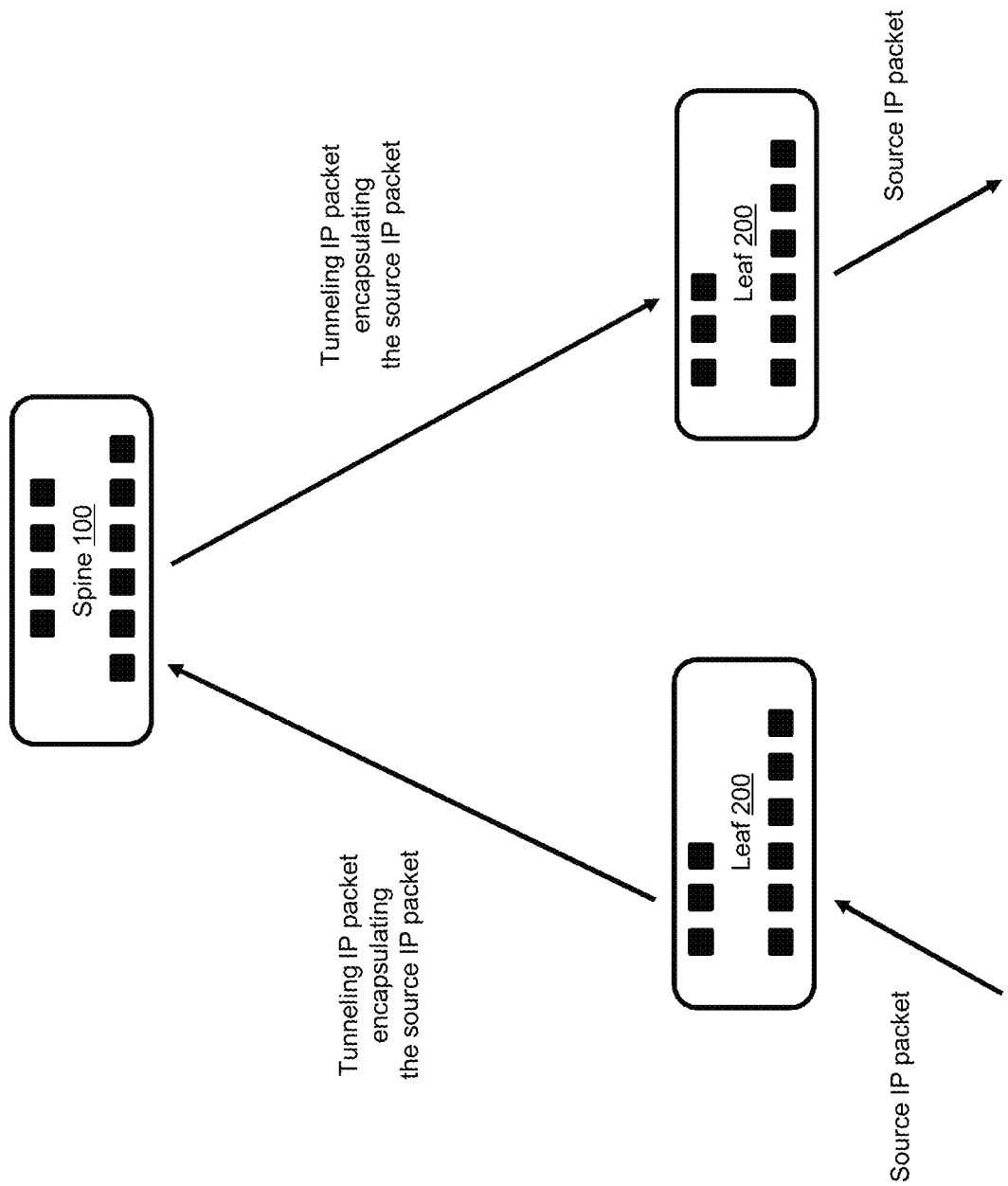

Referring now more particularly to FIGS. 3 and 5B, a source IP packet is received by a first leaf switch 200 and a tunneling IP packet encapsulating the source IP packet is generated. The tunneling IP packet is transmitted to a spine switch 100. The tunneling IP packet is then forwarded from the spine switch 100 to a second leaf switch 200, where the source IP packet is extracted from the tunneling IP packet. For example, the source IP packet is generated by a first server 300 and transmitted to the first leaf switch 200 (entry point of the tunnel). The source IP packet is transmitted by the second leaf switch 200 (exit point of the tunnel) to a second server 300. The tunneling is used for optimizing the transfer of IP packets between two leaf switches 200 via at least one intermediate spine switch 100, and more specifically to simplify the processing performed by leaf switches 200 and spine switches 100. For example, the tunneling IP packet comprises a dedicated parsing offload header, which comprises the results of a parsing of the source IP packet at the entry point of the tunnel (the first leaf switch 200). Further nodes along the path of the tunnel (the spine switch 100 and the second leaf switch 200) rely on the information of the dedicated parsing offload header, and do not need to perform a parsing of the tunneled source IP packet. The aforementioned tunneling can also be used in the context of the exchange of IP packets between a controller 400 and a leaf switch 200 not directly connected to the controller 400 (exit point of the tunnel), via a leaf switch 200 (entry point of the tunnel) directly connected to the controller 400.

Figure 5C:
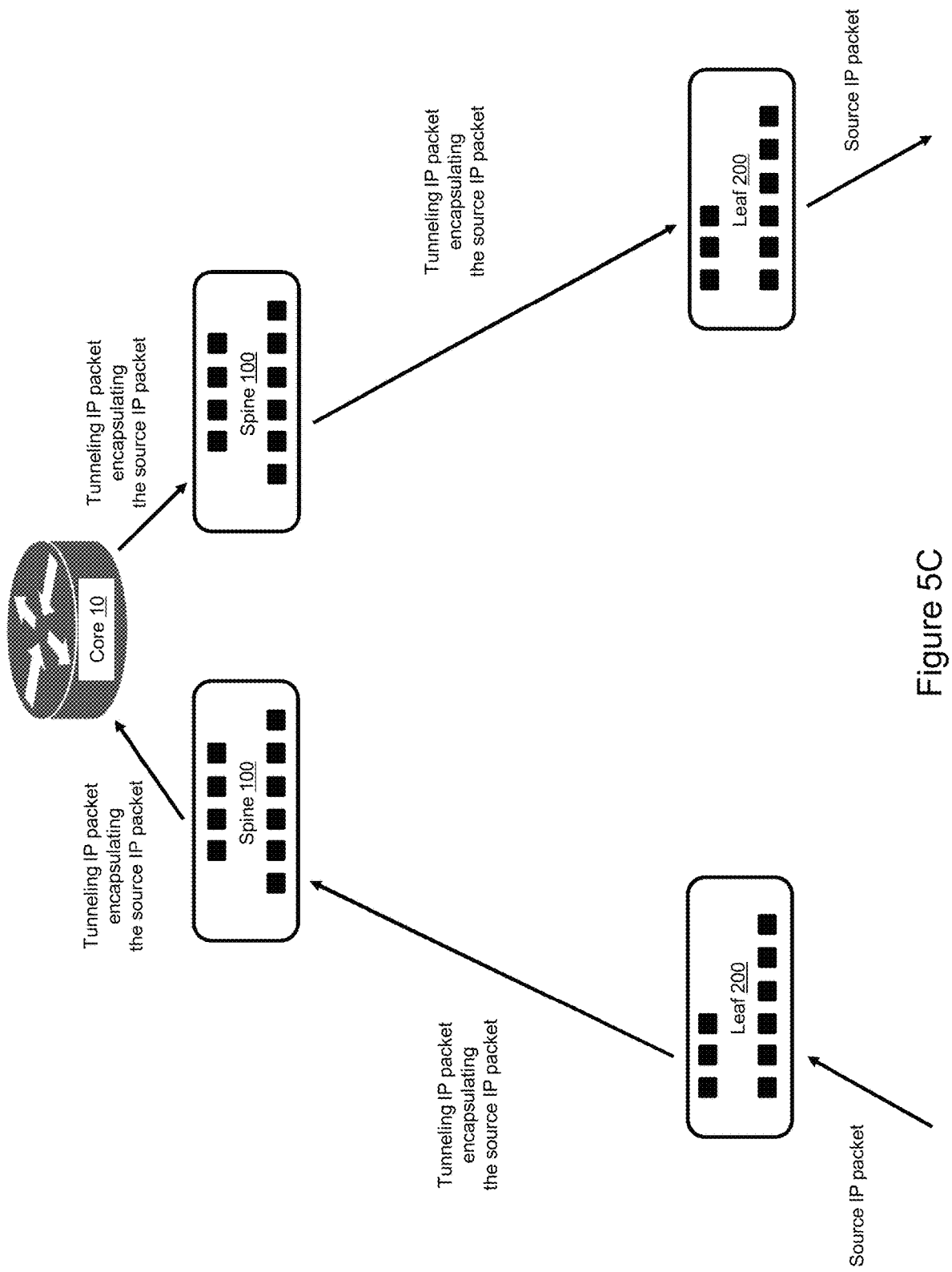

Reference is now made more particularly to FIGS. 3 and 5C. FIG. 5C is similar to FIG. 5B, except for the tunneling IP packet encapsulating the source IP packet transiting through a first spine switch 100 and a second spine switch 100. The two spine switches 100 may be located in the same fabric (as illustrated in FIG. 3); or may be located in two different fabrics (e.g. fabric A and fabric B of FIG. 1). The tunneling IP packet encapsulating the source IP packet transits through a core router 10 from the first spine switch 100 to the second spine switch 100. Alternatively, the tunneling IP packet encapsulating the source IP packet may be transferred directly from the first spine switch 100 to the second spine switch 100 (this configuration is not illustrated in the Figures).

Another usage of the tunneling protocol which applies to any of the use cases represented in FIGS. 5A, 5B and 5C consists in in-band telemetry. In-band telemetry is a technique for collecting information related to the networking infrastructure of the data center for the purposes of diagnostics, metrics, analytics, etc. One of the tunneling headers is a telemetry header. Each equipment receiving the tunneling IP packet records information into the telemetry header. In particular, the telemetry header is used for recording the path followed by each tunneling IP packet and corresponding operational parameters of the equipment along the followed path. This is particularly useful for a fabric having a complex networking infrastructure. For example, referring to FIGS. 5B and 5C, different paths could be used for tunneling IP packets from the first leaf switch 200 to the second leaf switch 200. The tunneling header allows the recording of information associated to each of the paths effectively followed by tunneling IP packets.

As mentioned previously, one drawback associated to the use of a tunneling protocol is that it generally increases the size of the packets transiting over the underlying networking infrastructure. Thus, a tunneling protocol generally consumes additional bandwidth resources, because the source IP packets are encapsulated into the tunneling IP packets. Each tunneling IP packet comprises one or more tunneling header, and the encapsulated source IP packet. The additional bandwidth consumed by the tunneling protocol depends on the number and size of the one or more tunneling header.

The present disclosure aims at optimizing the tunneling protocol, by removing (at least) one header of the source IP packet when it is encapsulated into the tunneling IP packet. This optimization is possible when information contained in the removed header are redundant with information contained in one or more tunneling header of the tunneling IP packet.

Figure 8:
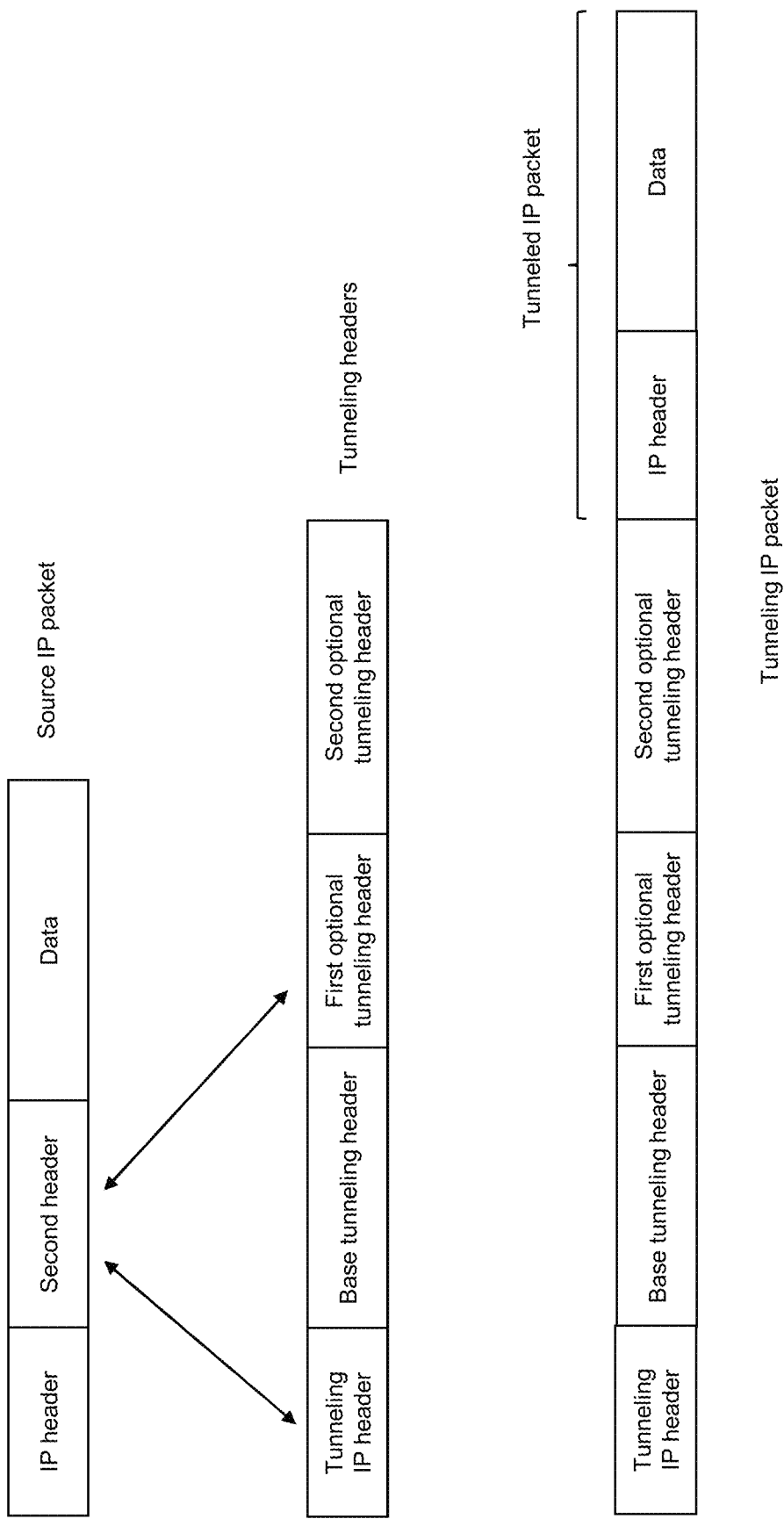
FIG. 8 represents examples of a source IP packet, a tunneling IP packet and a tunneled IP packet used in the context of the methods of FIGS. 6 and 7.

Referring now concurrently to FIGS. 4, 6 and 8, a method 600 for transmitting optimized tunneling IP packets is illustrated in FIG. 6.

A dedicated computer program has instructions for implementing the steps of the method 600. The instructions are comprised in a non-transitory computer program product (e.g. the memory 520) of the computing device 500. The instructions, when executed by the processing unit 510 of the computing device 500, provide for transmitting optimized tunneling IP packets. The instructions are deliverable to the computing device 500 via an electronically-readable media such as a storage media (e.g. CD-ROM, USB key, etc.), or via communication links (e.g. via a communication network through one of the one or more communication interface 530).

The computing device 500 executing the method 600 may consist of a switch, a router, a server, etc. FIGS. 5A, 5B and 5C illustrate examples where the computing device 500 is a spine switch 100 (FIG. 5A) or a leaf switch 200 (FIGS. 5B and 5C).

The method 600 comprises the step 605 of receiving an IP packet comprising at least one header. The IP packet is received via one of the one or more communication interface 530 of the computing device 500. Step 605 is executed by the processing unit 510 of the computing device 500.

FIG. 8 illustrates an example of the received IP packet (also referred to as the source IP packet) comprising a first header consisting of an IP header (either IPv4 or IPv6 header), a second header, and data.

The method 600 comprises the step 610 of generating one or more tunneling header of a tunneling IP packet for tunneling the received IP packet. Step 610 is executed by the processing unit 510 of the computing device 500.

FIG. 8 illustrates an example of the one or more tunneling header comprising a tunneling IP header (either IPv4 or IPv6 header), a base tunneling header, a first optional tunneling header, and a second optional tunneling header. An optional tunneling header is a tunneling header that may or may not be present among the one or more tunneling header. A plurality of optional tunneling headers may be present simultaneously among the one or more tunneling header. The base tunneling header comprises a headers map for defining which type(s) of optional tunneling header(s) is (are) present. Examples of optional tunneling headers include a telemetry header, a parsing offload header, etc.

The method 600 comprises the step 615 of determining if data comprised in one of the at least one header of the received IP packet are redundant with data comprised in the one or more tunneling header of the tunneling IP packet. Step 615 is executed by the processing unit 510 of the computing device 500.

The determination is positive for a candidate header of the received (at step 605) IP packet if the one or more tunneling header of the tunneling IP packet can be used for determining all the data present in the candidate header of the received IP packet. Otherwise, the determination is negative.

FIG. 8 illustrates an example where all the data of the second header of the source IP packet can be determined based on the data comprised in the tunneling IP header and the first optional tunneling header. It should be noted that only a subset of the data comprised in the tunneling IP header and only a subset of the data comprised in the first optional tunneling header may be sufficient, when used in combination, for determining all the data of the second header of the source IP packet.

The method 600 comprises the step 620 applied when the determination at step 615 is positive. Step 620 comprises removing the header comprising the redundant data from the received IP packet. Step 620 further comprises positioning a field in one of the one or more tunneling header of the tunneling IP packet to indicate the positive determination of redundancy. In the rest of the description, this field will be referred to as the header removal field. Step 620 is executed by the processing unit 510 of the computing device 500.

FIG. 8 illustrates the resulting tunneling IP packet comprising the encapsulated source IP packet with its second header having been removed (the encapsulated source IP packet is referred to in FIG. 8 as the tunneled IP packet).

The method 600 comprises the step 625 applied when the determination at step 615 is negative. Step 625 comprises positioning the header removal field in one of the one or more tunneling header of the tunneling IP packet to indicate the negative determination of redundancy. Step 625 is executed by the processing unit 510 of the computing device 500.

The header removal field has not been represented in FIG. 8 for simplification purposes. A single bit taking the value 1 (or 0) in case of redundancy and 0 (or 1) in case of no redundancy can be used. The header removal field is preferably included in the base tunneling header, which is always present in the tunneling IP packets. However, the header removal field may also be included in another tunneling header (e.g. a telemetry header) if it is also always present in the tunneling IP packets.

The method 600 comprises the step 630 of generating the tunneling IP packet comprising the one or more tunneling header. The generation of the tunneling IP packet includes encapsulating the received (at step 605) IP packet into the tunneling IP packet. Step 630 is executed by the processing unit 510 of the computing device 500.

If step 620 has been applied, the received IP packet encapsulated into the tunneling IP packet lacks the header which has been removed at step 620.

If step 625 has been applied, the received IP packet encapsulated into the tunneling IP packet comprises all its original headers (as received at step 605).

FIG. 8 illustrates the generated tunneling IP packet comprising all the tunneling headers followed by the tunneled IP packet (the encapsulated source IP packet with its second header removed).

Although not represented in FIG. 6 for simplification purposes, the method 600 comprises the additional step of transmitting the tunneling IP packet via one of the one or more communication interface 530 of the computing device 500. This step is also executed by the processing unit 510 of the computing device 500. The communication interface 530 used at this step may be the same or different from the communication interface 530 used at step 605.

It should be noted that the order of some of the steps of the method 600 may be modified without impacting the functionalities provided by the method 600. As illustrated in FIG. 6, the removal of the header from the source IP packet performed at step 620 occurs before the generation of the tunneling IP packet performed at step 630.

Alternatively, the generation of the tunneling IP packet may be performed first, using directly the source IP packet received at step 605. Then, the optional removal of the header performed at step 620 is performed directly on the tunneling IP packet comprising the encapsulated source IP packet. In this case, step 630 is performed before step 615.

Referring now concurrently to FIGS. 4, 6, 7 and 8, a method 700 for receiving optimized tunneling IP packets is illustrated in FIG. 7.

A dedicated computer program has instructions for implementing the steps of the method 700. The instructions are comprised in a non-transitory computer program product (e.g. the memory 520) of the computing device 500. The instructions, when executed by the processing unit 510 of the computing device 500, provide for receiving optimized tunneling IP packets. The instructions are deliverable to the computing device 500 via an electronically-readable media such as a storage media (e.g. CD-ROM, USB key, etc.), or via communication links (e.g. via a communication network through one of the one or more communication interface 530).

As mentioned previously, the computing device 500 executing the method 700 may consist of a switch, a router, a server, etc. FIGS. 5A, 5B and 5C illustrate examples where the computing device 500 is a leaf switch 200. However, as mentioned previously in reference to FIG. 5A, the computing device 500 may also be a spine switch 100.

The method 700 is complementary to the method 600. For instance, referring to FIG. 5A, the spine switch 100 executes the method 600 and the leaf switch 200 executes the method 700. Referring to FIGS. 6B and 6C, the first leaf switch 200 executes the method 600 and the second leaf switch 200 executes the method 700. A given equipment generally executes both methods: the method 600 for a source IP packet entering the tunnel; and the method 700 for a tunneled IP packet (corresponding to a source IP packet having entered the tunnel) exiting the tunnel.

The method 700 comprises the step 705 of receiving a tunneling IP packet comprising one or more tunneling header. The tunneling IP packet encapsulates a tunneled IP packet. The tunneling IP packet is received via one of the one or more communication interface 530 of the computing device 500. Step 705 is executed by the processing unit 510 of the computing device 500.

FIG. 8 illustrates an example of the received tunneling IP packet encapsulating the tunneled IP packet, where the tunneled IP packet comprises the IP header and the data.

The method 700 comprises the step 710 of extracting the tunneled IP packet from the tunneling IP packet. Step 710 is executed by the processing unit 510 of the computing device 500.

The method 700 comprises the step 715 of determining if a header of the tunneled IP packet has been removed based on the value of a header removal field located in one of the one or more tunneling header. Step 715 is executed by the processing unit 510 of the computing device 500. As mentioned previously, the header removal field is preferably included in the base tunneling header, which is always present in the tunneling IP packets. However, the header removal field may also be included in another tunneling header.

The method 700 comprises the step 720 applied when the determination at step 715 is positive. Step 720 comprises generating the removed header of the tunneled IP packet using data of the one or more tunneling header. Step 720 further comprises adding the generated removed header to the tunneled IP packet. Step 720 is executed by the processing unit 510 of the computing device 500.

FIG. 8 illustrates the source IP packet reconstructed at step 720 by adding the second header to the tunneled IP packet; where the second header is generated based on the tunneling IP header and the first optional tunneling header of the tunneling IP packet.

When the determination at step 715 is negative, nothing needs to be done.

The method 700 comprises the step 725 of processing the tunneled IP packet (extracted at step 710 and optionally restored according to step 720). Step 725 is executed by the processing unit 510 of the computing device 500.

For example, step 725 comprises transmitting the tunneled IP packet via one of the one or more communication interface 530 of the computing device 500. The communication interface 530 used at this step may be the same or different from the communication interface 530 used at step 705. Alternatively or complementarity, step 725 comprises extracting data from the tunneled IP packet and processing the extracted data, modifying data included in the tunneled IP packet, etc.

The tunneled IP packet processed at step 725 corresponds to the IP packet received at step 605 of the method 600.

Following is an exemplary use case where the tunneling header(s) include a parsing offload header. The parsing offload header is created by the equipment at the entry point of the tunnel based on information extracted from headers of the source IP packet. Following are examples of the data included in the parsing offload header, which are provided for illustration purposes only. Different and/or additional data may be included in the parsing offload header. As mentioned, previously, equipment within the path of the tunnel can use the data of the parsing offload header directly, instead of having to parse the entire tunneled IP packet to have access to these data.

In the case of a source IPv6 packet, the source IPv6 address and the destination IPv6 address of the source IPv6 packet are included in the parsing offload header.

In the case of a source IPv4 packet, the source IPv4 address and the destination IPv4 address of the source IPv4 packet are included in the parsing offload header.

The transport protocol number (e.g. 6 for TCP, 17 for UDP, etc.) of the source IP packet is included in the parsing offload header.

The upper layer source port and the upper layer destination port (e.g. TCP ports and/or UDP ports for applications such as Hypertext Transfer Protocol (HTTP), File Transfer Protocol (FTP), Secure Shell (SSH), etc.) of the source IP packet are included in the parsing offload header. Only one of the upper layer source port and the upper layer destination port may be present in the parsing offload header.

Thus, the parsing offload header includes information that is sufficient (possibly in combination with information from one or more other tunneling header) to reconstruct an IPv4 header, an IPv6 header, a TCP header, a UDP header, etc. of the source IP packet at step 720 of the method 700.

Furthermore, the information included in the parsing offload header provides insights on the type of header originally present in the source IP packet which has been removed if the header removal field is positioned.

For example, if the header removal field is positioned, if the tunneled IP packet does not have an IP header, and if the source IPv4 address and the destination IPv4 address are present in the parsing offload header; then the source IP packet comprised an IPv4 header which has been removed at step 620 and can be reconstructed at step 720.

Similarly, if the header removal field is positioned, if the tunneled IP packet does not have an IP header, and if the source IPv6 address and the destination IPv6 address are present in the parsing offload header; then the source IP packet comprised an IPv6 header which has been removed at step 620 and can be reconstructed at step 720.

In another example, if the header removal field is positioned, if the tunneled IP packet does not have a UDP header, and if the transport protocol number is set to UDP in the parsing offload header; then the source IP packet comprised an UDP header which has been removed at step 620 and can be reconstructed at step 720.

Similarly, if the header removal field is positioned, if the tunneled IP packet does not have a TCP header, and if the transport protocol number is set to TCP in the parsing offload header; then the source IP packet comprised a TCP header which has been removed at step 620 and can be reconstructed at step 720.

Furthermore, the usage of the parsing offload header supports the removal of several headers in the source IP packet at steps 615 and 620 of the method 600; and the generation of the removed header at steps 715 and 720 of the method 700.

For example, if the header removal field is positioned, if the tunneled IP packet does not have an IP header, if the tunneled IP packet does not have a UDP header, if the source IPv4 address and the destination IPv4 address are present in the parsing offload header, and if the transport protocol number is set to UDP in the parsing offload header; then the source IP packet comprised an IPv4 header and a UDP header which have been removed at step 620 and can be reconstructed at step 720.

Similarly, if the header removal field is positioned, if the tunneled IP packet does not have an IPv6 header, if the tunneled IP packet does not have a TCP header, if the source IPv6 address and the destination IPv6 address are present in the parsing offload header, and if the transport protocol number is set to TCP in the parsing offload header; then the source IP packet comprised an IPv6 header and a TCP header which have been removed at step 620 and can be reconstructed at step 720.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A computing device comprising:
a communication interface; and
a processing unit comprising one or more processor(s) for:
receiving via the communication interface an Internet Protocol (IP) packet comprising at least one header;
generating one or more tunneling header of a tunneling IP packet for tunneling the received IP packet;
determining if all the data comprised in one of the at least one header of the received IP packet are redundant with data comprised in the one or more tunneling header of the tunneling IP packet;
if the determination is positive, removing the header comprising the redundant data from the received IP packet and setting the value of a header removal field in one of the one or more tunneling header of the tunneling IP packet to indicate the positive determination of redundancy;
if the determination is negative, positioning the value of the header removal field to indicate the negative determination of redundancy; and
generating the tunneling IP packet comprising the one or more tunneling header, the generation of the tunneling IP packet including encapsulating the received IP packet into the tunneling IP packet.

2. The computing device of claim 1, wherein the processing unit further transmits the tunneling IP packet via the communication interface or another communication interface of the computing device.

3. The computing device of claim 1, wherein the one or more tunneling header of the tunneling IP packet comprises a base tunneling header and one or more optional tunneling header.

4. The computing device of claim 3, wherein the header removal field is located in the base tunneling header.

5. The computing device of claim 1, wherein the one or more tunneling header of the tunneling IP packet comprises a parsing offload header, the parsing offload header comprising data extracted by the processing unit of the computing device from one or more of the at least one header of the received IP packet.

6. The computing device of claim 5, wherein the parsing offload header comprises at least one of the following: a combination of a source IP address and a destination IP address of the received IP packet, a transport protocol number of the received IP packet, an upper layer source port of the received IP packet, and an upper layer destination port of the received IP packet.

7. The computing device of claim 5, wherein the received IP packet comprises a plurality of headers, all the data comprised in several headers of the received IP packet are redundant with data comprised in the one or more tunneling header of the tunneling IP packet, and the several headers comprising the redundant data are removed from the received IP packet.

8. A computing device comprising:
a communication interface; and
a processing unit comprising one or more processor(s) for:
receiving via the communication interface a tunneling Internet Protocol (IP) packet comprising one or more tunneling header, the tunneling IP packet encapsulating a tunneled IP packet;
extracting the tunneled IP packet from the tunneling IP packet;
determining if a header of the tunneled IP packet has been removed based on the value of a header removal field located in one of the one or more tunneling header, wherein removing the header of the tunneled IP packet comprises removing all fields included in the header of the tunneled IP packet; and
if the determination is positive, generating the removed header of the tunneled IP packet using data of the one or more tunneling header and adding the generated removed header to the tunneled IP packet.

9. The computing device of claim 8, wherein the processing unit further transmits the tunneled IP packet via the communication interface or another communication interface of the computing device.

10. The computing device of claim 8, wherein the one or more tunneling header of the tunneling IP packet comprises a base tunneling header and one or more optional tunneling header.

11. The computing device of claim 10, wherein the header removal field is located in the base tunneling header.

12. The computing device of claim 8, wherein the one or more tunneling header of the tunneling IP packet comprises a parsing offload header, the parsing offload header comprising data extracted by a processing unit of a remote computing device from one or more header of a source IP packet corresponding to the tunneled IP packet, the generation of the removed header of the tunneled IP packet using data of the parsing offload header.

13. The computing device of claim 12, wherein the parsing offload header comprises at least one of the following: a combination of a source IP address and a destination IP address of the source IP packet corresponding to the tunneled IP packet, a transport protocol number of the source IP packet corresponding to the tunneled IP packet, an upper layer source port of the source IP packet corresponding to the tunneled IP packet, and an upper layer destination port of the source IP packet corresponding to the tunneled IP packet.

14. The computing device of claim 12, wherein the processing unit of the computing device uses the header removal field and the parsing offload header for determining that several headers of the tunneled IP packet have been removed and generating the several removed headers of the tunneled IP packet.

15. A method for transmitting optimized tunneling Internet Protocol (IP) packets, the method comprising:
receiving by a processing unit of a computing device via a communication interface of the computing device an IP packet comprising at least one header;
generating by the processing unit of the computing device one or more tunneling header of a tunneling IP packet for tunneling the received IP packet;
determining by the processing unit of the computing device if all the data comprised in one of the at least one header of the received IP packet are redundant with data comprised in the one or more tunneling header of the tunneling IP packet;
if the determination is positive, removing by the processing unit of the computing device the header comprising the redundant data from the received IP packet and setting by the processing unit of the computing device the value of a header removal field in one of the one or more tunneling header of the tunneling IP packet to indicate the positive determination of redundancy;
if the determination is negative, positioning by the processing unit of the computing device the value of the header removal field to indicate the negative determination of redundancy; and
generating by the processing unit of the computing device the tunneling IP packet comprising the one or more tunneling header, the generation of the tunneling IP packet including encapsulating the received IP packet into the tunneling IP packet.

16. The method of claim 15, further comprising transmitting by the processing unit of the computing device the tunneling IP packet via the communication interface or another communication interface of the computing device.

17. The method of claim 15, wherein the one or more tunneling header of the tunneling IP packet comprises a base tunneling header and one or more optional tunneling header.

18. The method of claim 17, wherein the header removal field is located in the base tunneling header.

19. The method of claim 15, wherein the one or more tunneling header of the tunneling IP packet comprises a parsing offload header, the parsing offload header comprising data extracted by the processing unit of the computing device from one or more of the at least one header of the received IP packet.

20. The method of claim 19, wherein the parsing offload header comprises at least one of the following: a combination of a source IP address and a destination IP address of the received IP packet, a transport protocol number of the received IP packet, an upper layer source port of the received IP packet, and an upper layer destination port of the received IP packet.

21. The method of claim 19, wherein the received IP packet comprises a plurality of headers, all the data comprised in several headers of the received IP packet are redundant with data comprised in the one or more tunneling header of the tunneling IP packet, and the several headers comprising the redundant data are removed from the received IP packet.

22. A method for receiving optimized tunneling Internet Protocol (IP) packets, the method comprising:
- receiving by a processing unit of a computing device via a communication interface of the computing device a tunneling IP packet comprising one or more tunneling header, the tunneling IP packet encapsulating a tunneled IP packet;
- extracting by the processing unit of the computing device the tunneled IP packet from the tunneling IP packet;
- determining by the processing unit of the computing device if a header of the tunneled IP packet has been removed based on the value of a header removal field located in one of the one or more tunneling header, wherein removing the header of the tunneled IP packet comprise s removing all fields included in the header of the tunneled IP packet; and
- if the determination is positive, generating by the processing unit of the computing device the removed header of the tunneled IP packet using data of the one or more tunneling header and adding by the processing unit of the computing device the generated removed header to the tunneled IP packet.

23. The method of claim 22, further comprising transmitting by the processing unit of the computing device the tunneled IP packet via the communication interface or another communication interface of the computing device.

24. The method of claim 22, wherein the one or more tunneling header of the tunneling IP packet comprises a base tunneling header and one or more optional tunneling header.

25. The method of claim 24, wherein the header removal field is located in the base tunneling header.

26. The method of claim 22, wherein the one or more tunneling header of the tunneling IP packet comprises a parsing offload header, the parsing offload header comprising data extracted by a processing unit of a remote computing device from one or more header of a source IP packet corresponding to the tunneled IP packet, the generation of the removed header of the tunneled IP packet using data of the parsing offload header.

27. The method of claim 26, wherein the parsing offload header comprises at least one of the following: a combination of a source IP address and a destination IP address of the source IP packet corresponding to the tunneled IP packet, a transport protocol number of the source IP packet corresponding to the tunneled IP packet, an upper layer source port of the source IP packet corresponding to the tunneled IP packet, and an upper layer destination port of the source IP packet corresponding to the tunneled IP packet.

28. The method of claim 26, wherein the method comprises using by the processing unit of the computing device the header removal field and the parsing offload header for determining that several headers of the tunneled IP packet have been removed and generating the several removed headers of the tunneled IP packet.

* * * * *